US010055295B2

(12) United States Patent
Chinnakkonda Vidyapoornachary et al.

(10) Patent No.: US 10,055,295 B2
(45) Date of Patent: *Aug. 21, 2018

(54) USING SPARE CAPACITY IN SOLID STATE DRIVES

(71) Applicant: International Business Machines Corporation, Armonk, NY (US)

(72) Inventors: Diyanesh B. Chinnakkonda Vidyapoornachary, Bangalore (IN); David M. Daly, Croton-on-Hudson, NY (US); Gary A. Tressler, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/205,080

(22) Filed: Jul. 8, 2016

(65) Prior Publication Data

US 2016/0320992 A1 Nov. 3, 2016

Related U.S. Application Data

(63) Continuation of application No. 14/270,527, filed on May 6, 2014, now Pat. No. 9,471,428.

(51) Int. Cl.
*G06F 11/00* (2006.01)
*G06F 11/10* (2006.01)
(Continued)

(52) U.S. Cl.
CPC ........ *G06F 11/1088* (2013.01); *G06F 3/0608* (2013.01); *G06F 3/0616* (2013.01);
(Continued)

(58) Field of Classification Search
CPC .......................... G06F 11/2094; G06F 3/0614
See application file for complete search history.

(56) References Cited

U.S. PATENT DOCUMENTS 7,120,729 B2 10/2006 Gonzalez et al.
7,409,492 B2 8/2008 Tanaka et al.
(Continued)

FOREIGN PATENT DOCUMENTS

WO 2010041093 A1 4/2010
WO 2011099963 A1 8/2011
WO 2013095819 A1 6/2013

OTHER PUBLICATIONS

Caulfield et al., "Gordon: Using Flash Memory to Build Fast, Power-efficient Clusters for Data-intensive Applications," Proceedings of the 14th International Conference on Architectural Support for Programming Languages and Operating Systems, Mar. 7-11, 2009, pp. 217-228, Copyright 2009 ACM D.O.I. 10.1145/1508244. 1508270.

(Continued)

*Primary Examiner* — Philip Guyton
(74) *Attorney, Agent, or Firm* — Nicholas D. Bowman

(57) ABSTRACT

An SSD has a plurality of dies, with each die having a storage capacity. The storage capacity of each die is divided into a primary capacity and a spare capacity. A primary die has a maximum primary capacity, and a sum of the spare capacities of the remaining dies is greater than the maximum primary capacity. Data stored on the SSD is distributed among the primary capacities of the dies. When a failure of a first die is detected, data stored on the failed first die is migrated to the spare capacity of at least one of the remaining dies.

10 Claims, 4 Drawing Sheets

(51) Int. Cl.
*G06F 11/20* (2006.01)
*G06F 3/06* (2006.01)

(52) U.S. Cl.
CPC .......... *G06F 3/0619* (2013.01); *G06F 3/0644* (2013.01); *G06F 3/0647* (2013.01); *G06F 3/0658* (2013.01); *G06F 3/0679* (2013.01); *G06F 11/108* (2013.01); *G06F 11/2041* (2013.01); *G06F 11/2058* (2013.01); *G06F 11/2084* (2013.01); *G06F 11/2094* (2013.01); *G06F 2201/805* (2013.01); *G06F 2201/84* (2013.01)

(56) References Cited

U.S. PATENT DOCUMENTS

| | | |
|---|---|---|
| 8,214,580 B2 | 7/2012 | Lucas et al. |
| 8,261,013 B2 | 9/2012 | Schmidberger |
| 8,275,928 B2 | 9/2012 | Lin |
| 8,516,213 B2 | 8/2013 | He et al. |
| 8,516,343 B2 | 8/2013 | Flynn et al. |
| 8,572,311 B1 | 10/2013 | Shalvi et al. |
| 9,286,002 B1 | 3/2016 | Karamcheti et al. |
| 9,471,428 B2 * | 10/2016 | Chinnakkonda Vidyapoornachary ........................... G06F 11/1088 |
| 9,495,248 B2 * | 11/2016 | Chinnakkonda Vidyapoornachary ........................... G06F 11/108 |
| 2002/0091965 A1 | 7/2002 | Moshayedi |
| 2009/0070520 A1 | 3/2009 | Mizushima |
| 2010/0017556 A1 | 1/2010 | Chin et al. |
| 2010/0017650 A1 | 1/2010 | Chin et al. |
| 2010/0241793 A1 | 9/2010 | Sugimoto et al. |
| 2011/0099419 A1 | 4/2011 | Lucas et al. |
| 2011/0131367 A1 | 6/2011 | Park et al. |
| 2011/0161562 A1 | 6/2011 | Chang et al. |
| 2011/0167319 A1 | 7/2011 | Jeddeloh |
| 2011/0185113 A1 | 7/2011 | Goss et al. |
| 2011/0213908 A1 | 9/2011 | Bennett |
| 2012/0173792 A1 | 7/2012 | Lassa et al. |
| 2012/0278535 A1 | 11/2012 | Yeh |
| 2012/0317332 A1 | 12/2012 | Kwak et al. |
| 2013/0007353 A1 | 1/2013 | Shim et al. |
| 2013/0262751 A1 | 10/2013 | Kwak |
| 2013/0339820 A1 | 12/2013 | Cordero et al. |
| 2015/0324262 A1 | 11/2015 | Chinnakkonda Vidyapoornachary et al. |
| 2015/0324264 A1 | 11/2015 | Chinnakkonda Vidyapoornachary et al. |

OTHER PUBLICATIONS

Chung et al., "Nanoscale memory devices," Topical Review, Nanotechnology 21 (2010) 412001, Published Sep. 17, 2010, 22 pages, Copyright 2010 IOP Publishing Ltd. D.O.I. 10.1088/0957-4484/21/41/412001.

Wikipedia, "Memory module", Wikipedia, the free encyclopedia, last modified on Jan. 25, 2016, last printed on Apr. 18, 2016, 1 page.

Wikipedia, "Die (integrated circuit)", Wikipedia, the free encyclopedia, last modified on Apr. 12, 2016, last printed Apr. 18, 2016, 3 pages.

IBM, List of IBM Patents or Patent Applications Treated as Related, Jul. 7, 2016, 2 pages.

* cited by examiner

USING SPARE CAPACITY IN SOLID STATE DRIVES

BACKGROUND

The present disclosure relates to computer memory, and more specifically, to solid state drives (SSDs).

SSDs are increasingly being used in modern computers, often instead of other categories of storage mediums, such as hard disk drives (HDDs). Lacking in requirements for moving mechanical parts, SSDs are less susceptible to mechanical failures than their HDD counterparts. In a common commercial form, an SSD includes a controller chip that is operatively connected to one or more memory components that store data. Often the memory components incorporate non-volatile NAND flash memory. Recently, three-dimensional SSDs, more specifically 3D flash-based SSDs, have also become available. These devices allow for denser memory storage as compared to older, two-dimensional SSDs.

SUMMARY

According to embodiments of the present disclosure, aspects of the disclosure may include a method, a system, and a computer program product for managing the storage of data on a solid state drive (SSD). The SSD may have a plurality of dies, and each die may have a storage capacity. The storage capacity of each die may be divided into a primary capacity and a spare capacity. A primary die may have a maximum primary capacity. The sum of the spare capacities of all dies except the primary die may be at least as great as the maximum primary capacity. The data may be stored on the SSD. The stored data may be distributed among each of the primary capacities, and a first portion of the data may be stored in the primary capacity of a first die. A failure of the first die may be detected, and, in response, the first portion of the data may be migrated to the spare capacities of the other dies.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
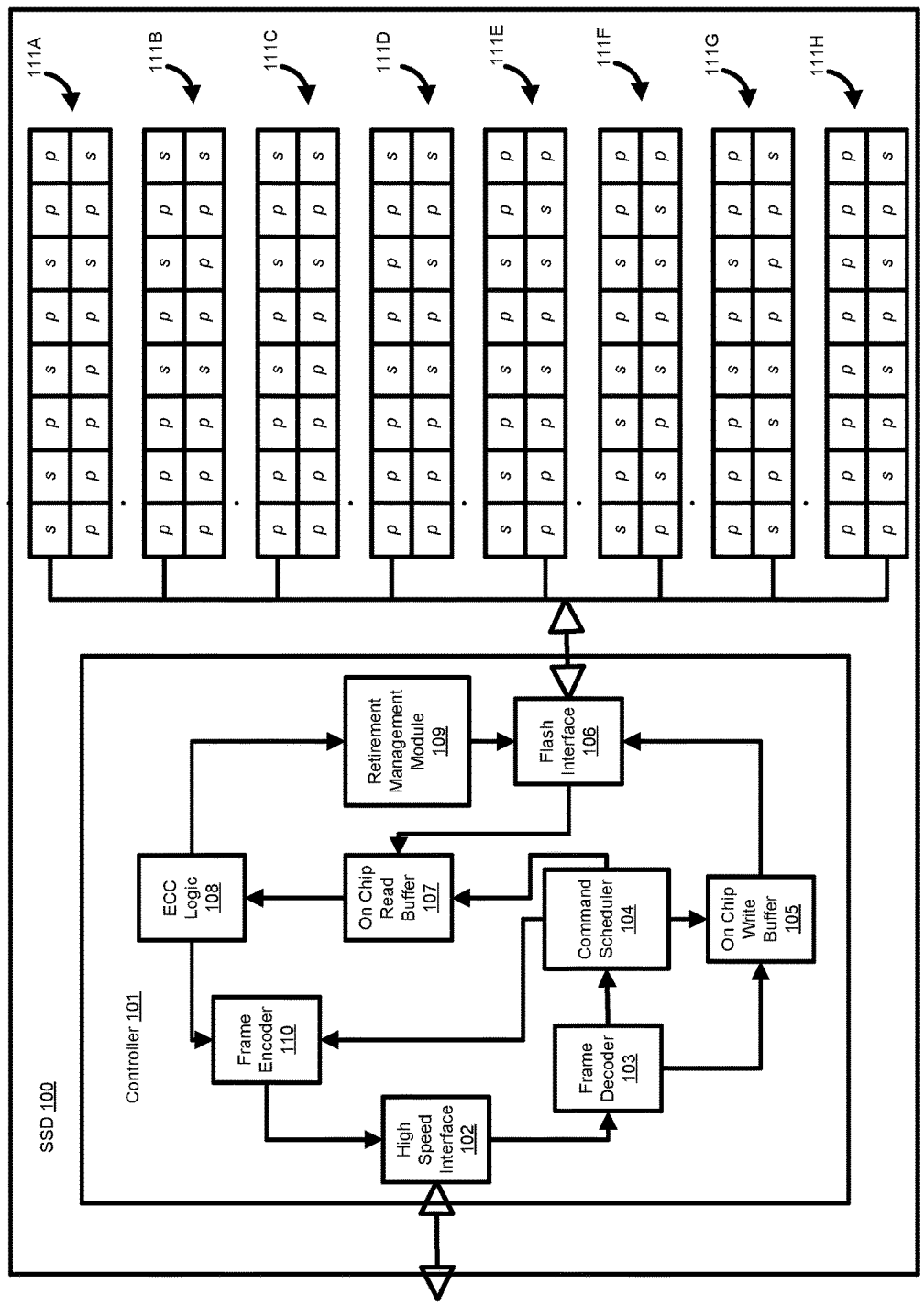
FIG. 1 illustrates a block diagram of an embodiment of an SSD of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer memory, more particular aspects relate to solid state drives (SSDs). While the present disclosure is not necessarily limited to such applications, various aspects of the disclosure may be appreciated through a discussion of various examples using this context.

SSDs are increasingly being used as the main working storage repository for data processing systems. Ensuring the integrity of data processed by these systems is critical for the reliable operation of such systems. Despite this necessity, some SSDs may not have the capacity to remain operational in the event of the failure of one or more flash dies. Some SSDs may incorporate separate, spare flash dies that remain unused until failures occur in operational flash dies. These SSDs may maintain one or more spare flash dies in reserve; then, upon failure of operational flash dies, may migrate data from the failed flash dies to the spare flash dies. While this approach may increase the ability of these SSDs to mitigate the effects of flash die failures, the approach may still have some drawbacks. For example, because the spare flash dies in these SSDs are only used in the event of failure of operational flash dies, less than optimal relative wear may occur among the flash dies of these SSDs, and overall lifetime of these SSDs may likewise be suboptimal.

A few additional concepts may also be used to increase the useful lives of individual dies or SSDs generally. One such concept is wear leveling. Wear leveling techniques involve moving the locations of data between die blocks during read/write cycles so as to ensure roughly equal wear among the individual blocks. During some forms of wear leveling, data may be migrated from a used block to a spare block that may have been previously unused for data storage. This may help to ensure that the spare block is used at some point during the useful life of an SSD. Another concept is over provisioning, which involves maintaining a significant portion of the blocks of a die as unused so as to continually have significant space available to be used for memory management purposes.

FIG. 1 illustrates an embodiment of an SSD 100 of the present invention. In an embodiment, the invention may comprise a 3D flash based SSD or any other three-dimensional solid state drive having multiple stacked flash dies operatively connected to a controller. Other embodiments may comprise two-dimensional solid state drives or solid state drives having multiple memory devices arranged in various arrays. SSD 100 comprises SSD controller 101 and memory devices 111A-111H. In an embodiment, memory devices 111A-111H may comprise flash memory dies or other types of dies. Eight dies are described here for illustrative purposes only; any number of dies may be employed in an SSD 100. The use of other types of non-volatile memory devices is also contemplated. SSD controller 101 may communicate with a computing system (not shown) via high speed interface 102, which may comprise Serial Advanced Technology Attachment (SATA), Fibre Channel (FC), Peripheral Component Interconnect Express (PCIe), Serial Attached Small Computer System Interface (SAS), or any other appropriate type of transmit and receive ports. Data to be written into the SSD memory may be received on high speed interface 102, and sent to on-chip write buffer 105 via frame decoder 103. From on-chip write buffer 105, the write data may be written into the appropriate die 111A-111H, as determined by the controller 101, via flash interface 106. For SSD read operations, data may be read out of the die 111A-111H via flash interface 106, and the read out data may be sent to on-chip read buffer 107, then to high speed interface 102 via error checking and correction (ECC) logic 108 and frame encoder 110. Command scheduler 104 may receive commands from the computing system (not shown) via frame decoder 103, and may control on-chip write buffer 105, flash interface 106, on-chip read buffer 107, and frame encoder 110. Error checking and correction (ECC) logic 108 may perform error correction functions and send information regarding bit errors to the retirement management module 109. Retirement management module 109 may perform block and die retirement operations based on detected failures, as discussed in more detail below. Flash interface 106 may comprise a plurality of flash ports in communication with flash busses. Each of the flash busses may connect to one or more dies 111A-111H through the use of independent chip selects and on chip addressing. The flash busses may comprise 64 bit busses in some embodiments. When a write or read occurs, all busses may be accessed.

Figure 2:
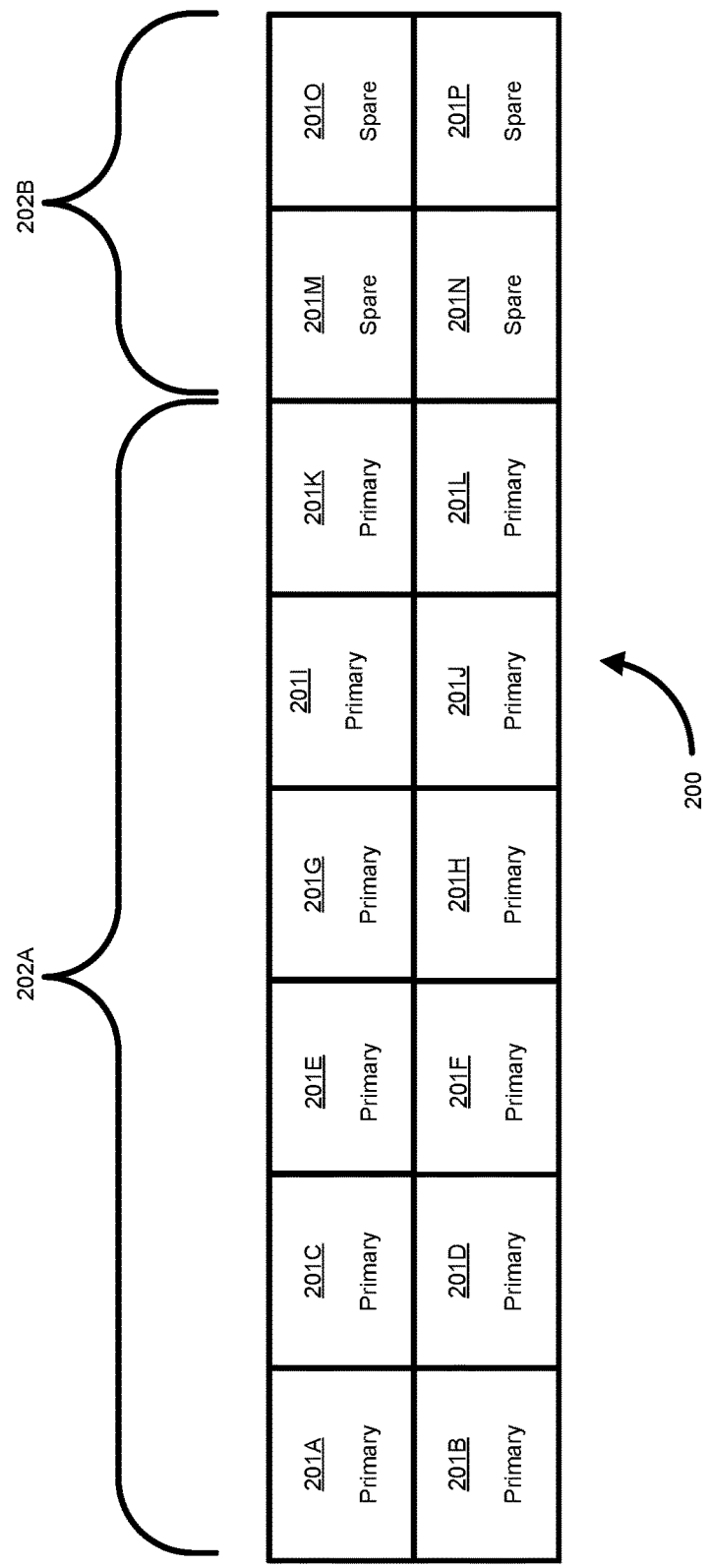
FIG. 2 illustrates a block diagram of a die used in an embodiment of the present invention.

In an embodiment, as shown in FIG. 2, a die 200 of an embodiment of the present invention may comprise blocks 201A-201P as the smallest erasable units of memory on the die. Each block 201A-201P may be further subdivided into a number of pages. Sixteen blocks are shown in FIG. 2 only for illustration; typically a die employed in an embodiment of the present invention may employ many more blocks. As shown, the blocks 201A-201P may be allocated by the controller 101 into different categories, with blocks 201A-201L comprising a primary capacity 202A of die 200 and blocks 201M-201P comprising its spare capacity 202B. The primary capacity 202A may be the portion of the storage capacity initially made available for storing the user's data. In addition to serving the general purposes of over provisioning, the spare capacity 202B may also serve as replacement or reserve storage capacity in the event of the failure of one or more blocks 201A-201P of die 200, the failure of blocks of another die incorporated into the same SSD as die 200, or the failure of one of those other dies itself.

In some embodiments, the number of blocks designated as part of the primary capacity 202A and number of blocks designated as part of the spare capacity 202B may not be equal, and the relative proportions of primary capacity 202A and spare capacity 202B may be set by the user, or in the alternative, set by a computer or controller 101. For example, in some embodiments, for each die of an SSD, its amount of primary capacity may be greater than its amount of spare capacity. Additionally, the division of blocks 201A-201P between primary capacity 202A and spare capacity 202B may not be stagnant. Even while the relative percentage of blocks in each of the primary capacity 202A and spare capacity 202B may remain constant, individual blocks 201A-201P may be moved between these categories for various reasons or purposes. For example, blocks may go from being part of one category to being part of the other category during various forms of wear leveling (with blocks allocated as part of the spare capacity being reallocated as part of the primary capacity and vice versa).

Returning to FIG. 1, dies 111A-111H may be substantially similar to die 200 in terms of physical structure and memory allocation or may have differing storage capacities or relative proportions of primary capacities and spare capacities. As shown, each of the dies 111A-111H may have a number of blocks comprising its primary capacity (marked with p's) and other blocks comprising its spare capacity (marked with s's).

To determine if a block retirement operation may be necessary in a given block of a die of SSD 100 (for example, die 111B), the retirement management module 109 may maintain a record of the number of unusable pages per each block of die 111B, wherein a page may be unusable once the bit error rate within the page exceeds the capacity of the ECC logic 108 to correct for the errors. Once the number of unusable pages in a given block of die 111B exceeds a predetermined threshold amount (set by the user or otherwise), the block may be deemed to have failed. The failure may be detected, or in essence determined, by the retirement management module 109, and the block may be subject to a retirement operation wherein data stored on the block is migrated to another block of the spare capacity of one of the dies. The logical to physical mapping within SSD 100 may be updated accordingly and the retirement of the failed block recorded. The replacement block may be on the same die 111B as the failed block or it may be on a different die 111A, 111C-111H. Additional block retirement operations may occur as additional blocks of dies 111A-111H fail. The number of block failures that can be accommodated by the SSD 100 may be, in some instances, limited by the amount of spare capacity in the SSD 100.

While it is contemplated that block retirement management and die retirement management may be handled by different modules, in some embodiments both block and die retirement management may instead be performed by a single retirement management module 109. In such an embodiment, a die (for example, die 111H) may be deemed to have failed when a predetermined threshold amount of blocks in die 111H have been retired or have themselves otherwise failed. The fact that the block failure threshold has been exceeded may be detected, or in essence determined, by the retirement management module 109, and an operation may be performed to retire die 111H. During the die retirement operation, data may be migrated from the blocks of die 111H to blocks in the spare capacities of one or more of the remaining active dies (for example, dies 111A-111G). It is contemplated that the data may be migrated to as few as one or as many as all of the remaining usable dies 111A-111G. When the data is migrated from die 111H to more than one die, the data may be divided up into smaller portions, and the smaller portions may be divided among the individual receiving dies. Similarly to the procedure for block retirement, during die retirement the logical to physical mapping within SSD 100 may be updated accordingly and the retirement of die 111H may be recorded. This process may be repeatable as additional dies fail. However, the ability of the SSD 100 to accommodate die failure may be limited by the amount of spare capacity in SSD 100 as a whole. Die failures accommodated by some embodiments of this invention may occur before or after, and may or may not be related to, the failure or retirement of individual blocks within the dies.

Additional causes of block failures that may be mitigated by the use of some embodiments of the present invention may not be limited to the bit errors discussed. Other causes of block failure may include, for example, mechanical shock to SSD 100. Likewise, causes of die failures may not be limited to exceeding a threshold number of block failures and may include, for example, solder joint failures on a controller chip or a flash interface. In any case, once the block or die failure is detected by the retirement management module 109, action may be taken to retire the failed block or die.

In some embodiments, the primary capacity of any given die 111A-111H of the SSD 100 may be limited by the total spare capacities of the remaining dies of the SSD 100. More specifically, the amount of storage capacity allocated as primary capacity in the die having the most primary capacity (for example, die 111H) may need to be no more than the total amount of spare capacity allocated in the remaining dies 111A-111G of SSD 100. In these embodiments, additional spare capacity may also be allocated beyond this minimum amount so as to make the SSD capable of handling multiple die failures and/or a die failure even after a number of blocks have been retired in the remaining dies. This additional spare capacity may also increase the amount of over provisioning in one or more dies 111A-111H, which may increase the useful life of these dies and SSD 100.

Figure 3:
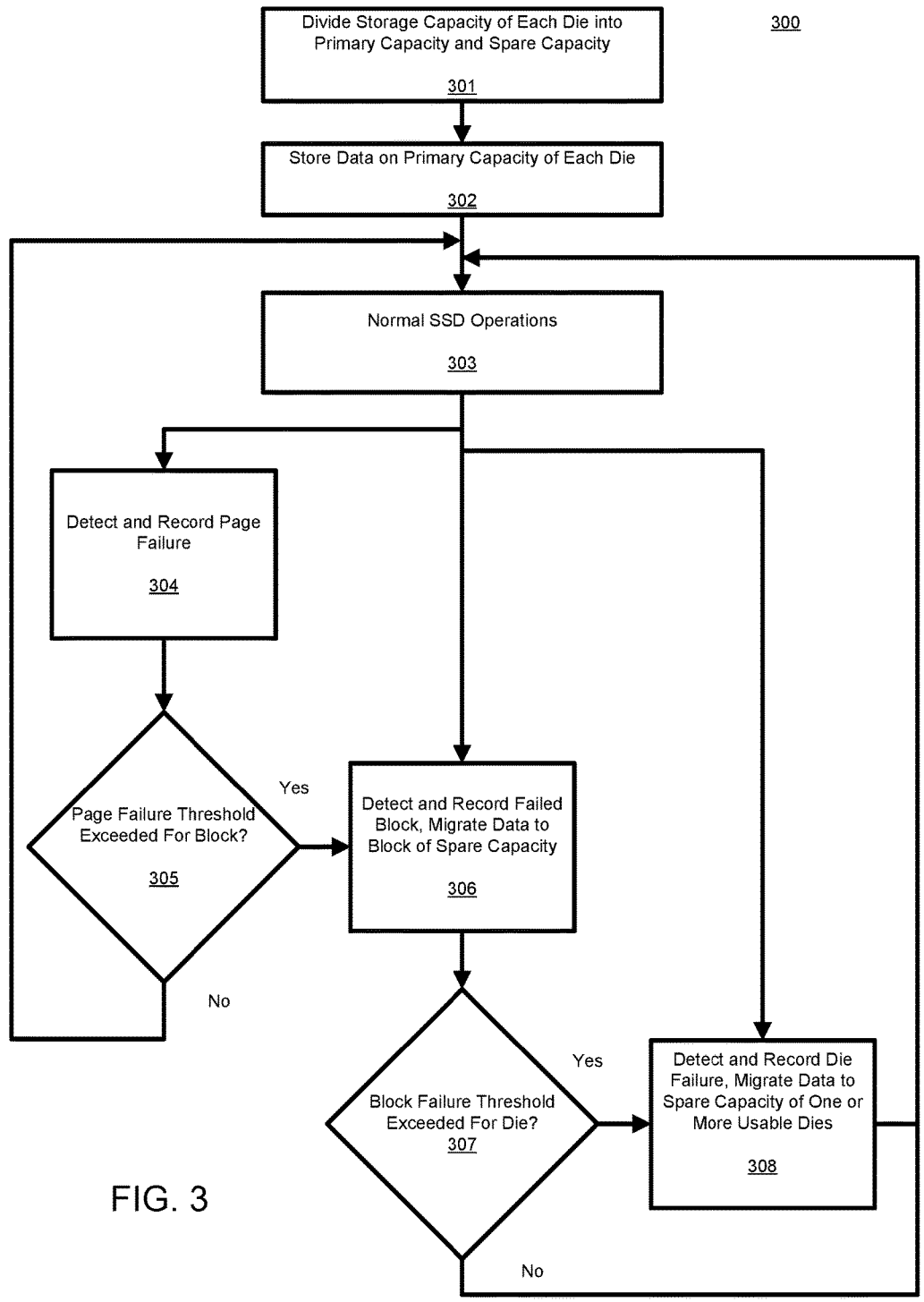
FIG. 3 illustrates a flowchart of an embodiment of a method for managing the storage of data on an SSD.

FIG. 3 illustrates an embodiment of a method 300 of the present invention. In 301, the storage capacity of each die of an SSD may be divided by a controller into a primary capacity and a spare capacity. In 302, portions of any data to be stored on the SSD may be stored on the primary capacity of each die. As more data is added, more blocks may be used for storage. The SSD may continue through normal read and write cycles in operation 303. During use of the SSD, per operation 304, a failure of a page within a block may be detected and recorded, possibly by the retirement management module 109 acting in conjunction with the ECC Logic 108. In 305, a determination may be made by the retirement management module 109 as to whether the failure of the page causes the number of failed pages within the block to exceed a preset threshold quantity. If the threshold has not been exceeded then normal operations 303 may continue in the SSD. If the threshold is exceeded, then, per 306, the retirement management module 109 may detect and record a failure of the block and data may be migrated from the failed block to another block of the spare capacity of one of the dies. At this point, the failed block may be deemed retired and no longer used for data storage.

Upon detection 306 of the failed block, a determination 307 may be made as to whether the failure of the block has caused a preset block failure threshold to be exceeded for a die of which the block is a part; if not, then normal operations 303 may be resumed. If the threshold is exceeded, then operation 308 may be performed with the die failure being detected and recorded and data stored on the failed die being migrated to the spare capacity of one or more of the remaining usable dies. The records within the SSD may be updated to reflect the data migration and normal SSD operations 303 may be resumed.

As illustrated in the flowchart of FIG. 3, normal operations 303 may also be interrupted by the detection 306 of a block failure that may not directly be the result of exceeding the page failure threshold 305. For example, a block may be deemed to have failed due to a mechanical shock to the SSD that causes the block to be damaged. In such an instance, retirement management module 109 may be used in a manner similar to the manner described above, and the data may be migrated from the damaged (failed) block to a block of the spare capacity of one of the dies. Similarly, as further illustrated in FIG. 3, normal operations 303 may also be interrupted by a die failure that may not be the direct result of a block failure threshold being exceeded for that die. This may result from, for example, the wearing out of one or more connections between the die and the controller. In such an instance, the die may need to be immediately retired by retirement management module 109 and the data thereon be migrated to spare blocks on one or more of the remaining dies, before normal operations 303 can be resumed.

Figure 4:
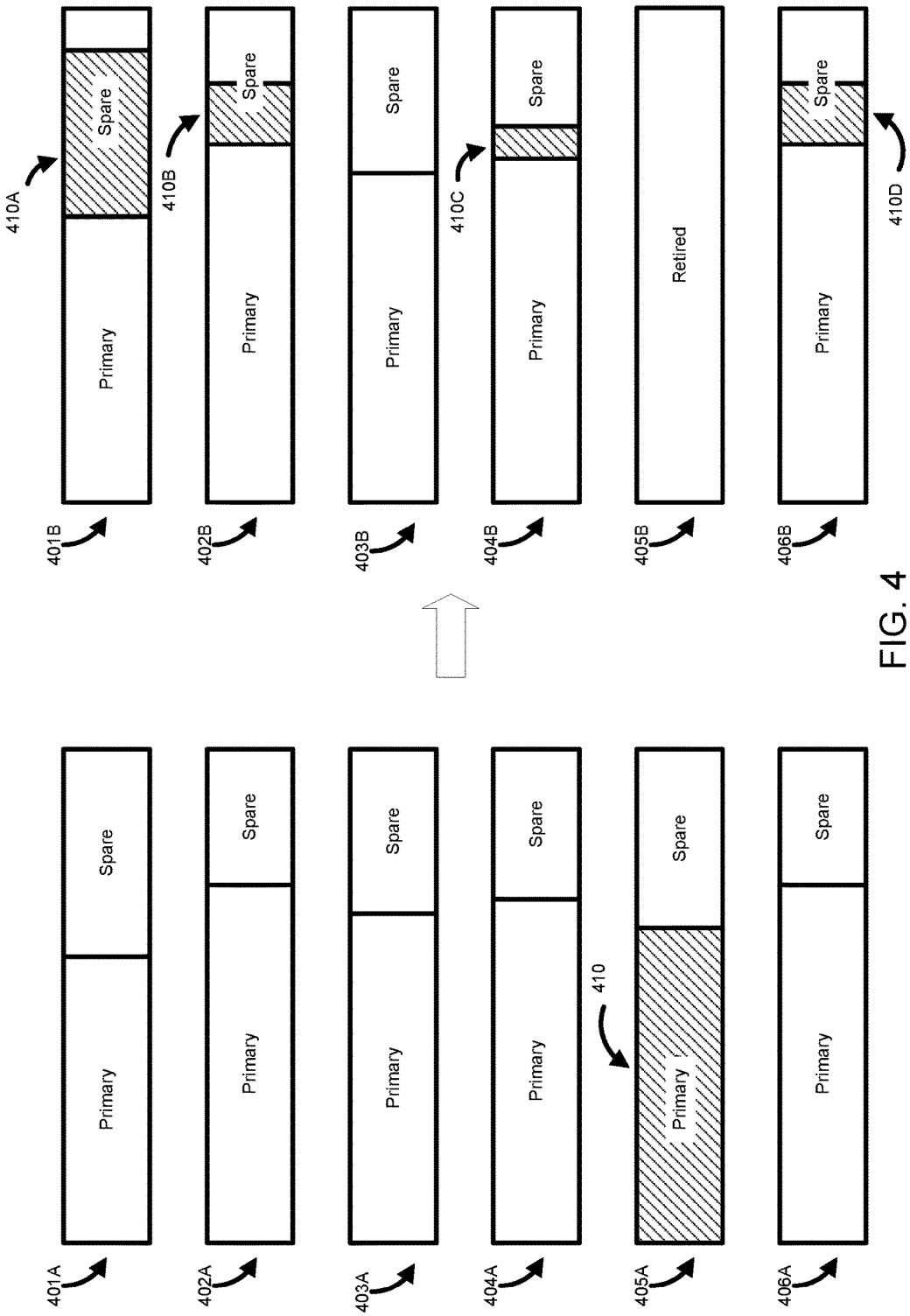
FIG. 4 illustrates the migration of data from a failed die in an SSD, according to an embodiment of the present invention.

FIG. 4 illustrates a block diagram of dies of a six-die SSD employing an embodiment of the present invention. Dies 401A-406A may represent the dies of the SSD as used prior to the failure of any one of the dies. Each die 401A-406A may have a portion designated as primary capacity and a portion designated as spare capacity. The primary capacity of each die 401A-406A may be used for storing data. The shaded portion of die 405A may represent the data 410 being stored on die 405A. Upon the failure of die 405A, the data 410 may be reallocated among the dies of the SSD. Due to its failure, the failed die, now represented by die 405B, may be retired and no longer used for storing data. As represented by the shaded portions of dies 401B, 402B, 404B, and 406B, the data 410 may be migrated to the spare capacity several of the remaining dies, with portions 410A, 410B, 410C, and 410D of data 410 being stored on each of dies 401B, 402B, 404B, and 406B, respectively. Upon completion of the migration, normal operations of the SSD may be resumed. In some embodiments, portions of the data stored on a failed die may be migrated to any number of remaining dies in any relative proportions. For example, upon the failure of die 405A, data 410 may be divided up equally among each of the dies 401B-404B, 406B.

In some embodiments of the invention, it may be possible to accommodate the failure of more than one die. For example, taking the embodiment illustrated in FIG. 4 a step further, it may be possible for the SSD to accommodate the failure of one of the remaining dies (for example, die 406B). Upon the failure of die 406B, the data stored thereon (which may include portion 410D of data 410 originally stored on die 405A) may be divided up among the remaining dies 401B-404B, with portions of the data being migrated to each of dies 401B-404B. In some embodiments, in order to accommodate the failure a second or subsequent failed die, it may be necessary to have enough spare capacity in the non-failed dies to not only accommodate the portion of data originally stored on the second or subsequent failed die, but also enough spare capacity to accommodate any data that may have been migrated to the second or subsequent die upon the failure of a prior failed die.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing the storage of data on a solid state drive (SSD), the SSD having a controller operatively coupled to a plurality of dies, each of the dies of the plurality of dies having a storage capacity, the computer program product comprising a computer readable storage medium having program instructions embodied therewith, the program instructions executable by the controller to cause the controller to:

divide the storage capacity of each die of the plurality of dies into a primary capacity and a spare capacity, wherein the dividing the storage capacity of each die of the plurality of dies into a primary capacity and a spare capacity comprises designating, by the controller, within each die of the plurality of dies a first plurality of blocks as the primary capacity and a second plurality of blocks as the spare capacity such that the controller does not allow an amount of the data stored in each die to exceed the designated primary capacity of the die, and wherein the designated primary capacity of each die is set by a user.

2. The computer program product of claim 1, wherein a primary die of the plurality of dies has a maximum primary capacity, and wherein a sum of the spare capacities of each of the plurality of dies excluding the primary die is at least as great as the maximum primary capacity.

3. The computer program product of claim 2, the program instructions executable by the controller to further cause the controller to:
store the data on the plurality of dies, the stored data distributed among each of the primary capacities, a first portion of the data stored in the primary capacity of a first die of the plurality of dies;
detect a failure of the first die;
in response to detecting the failure of the first die, retire the first die; and
in response to the detecting the failure of the first die and the retiring the first die, migrate the first portion of the data to the spare capacity of at least one die of the plurality of dies.

4. The computer program product of claim 2, wherein a second portion of the data is stored in the primary capacity of a second die of the plurality of dies, the program instructions executable by the controller to further cause the controller to:
subsequent to the failure of the first die, detect a failure of the second die;
in response to detecting the failure of the second die, retire the second die; and
in response to the detecting the failure of the second die and the retiring the second die, migrate the second portion of the data to the spare capacity of at least one die of the plurality of dies.

5. The computer program product of claim 2, wherein the at least one die of the plurality of dies is at least two dies of the plurality of dies.

6. The computer program product of claim 2, wherein after the detecting the failure of the first die, the plurality of dies includes at least three non-failed dies, and wherein the at least one of the plurality of dies is all of the at least three non-failed dies.

7. A system for managing the storage of data, the system comprising:
a plurality of dies, each die of the plurality of dies having a storage capacity; and
a controller operatively coupled to the plurality of dies, the controller configured to:
divide the storage capacity of each die of the plurality of dies into a primary capacity and a spare capacity, wherein the dividing the storage capacity of each die of the plurality of dies into a primary capacity and a spare capacity comprises designating, by the controller, within each die of the plurality of dies a first plurality of blocks as the primary capacity and a second plurality of blocks as the spare capacity such that the controller does not allow an amount of the data stored in each die to exceed the designated primary capacity of the die, and wherein the designated primary capacity of each die is set by a user.

8. The system of claim 7, wherein a primary die of the plurality of dies has a maximum primary capacity, and wherein a sum of the spare capacities of each of the plurality of dies excluding the primary die is at least as great as the maximum primary capacity.

9. A method for managing the storage of data on a solid state drive (SSD), the SSD having a plurality of dies, each die of the plurality of dies having a storage capacity, the method comprising:
dividing, by a controller operatively coupled to the plurality of dies, the storage capacity of each die of the plurality of dies into a primary capacity and a spare capacity, wherein the dividing the storage capacity of each die of the plurality of dies into a primary capacity and a spare capacity comprises designating, by the controller, within each die of the plurality of dies a first plurality of blocks as the primary capacity and a second plurality of blocks as the spare capacity such that the controller does not allow an amount of the data stored in each die to exceed the designated primary capacity of the die, and wherein the designated primary capacity of each die is set by a user.

10. The method of claim 9, wherein a primary die of the plurality of dies has a maximum primary capacity, and wherein a sum of the spare capacities of each of the plurality of dies excluding the primary die is at least as great as the maximum primary capacity.

* * * * *